United States Patent [19]

Schmelzer et al.

[11] Patent Number: 5,120,789
[45] Date of Patent: Jun. 9, 1992

[54] HOT MELT ADHESIVES HAVING IMPROVED POT LIVES AND PROCESSES FOR THEIR PREPARATION

[75] Inventors: Heinz Schmelzer, Ruemmelsheim; Manfred Kuechler, Oberursel, both of Fed. Rep. of Germany

[73] Assignee: Hoechst AG, Fed. Rep. of Germany

[21] Appl. No.: 641,496

[22] Filed: Jan. 15, 1991

[30] Foreign Application Priority Data

Jan. 19, 1990 [DE] Fed. Rep. of Germany ....... 4001431

[51] Int. Cl.$^5$ .................... C08L 61/10; C08F 222/00; C08F 220/56; C08F 220/06; C08F 220/10
[52] U.S. Cl. .................... 525/142; 525/329.4; 525/329.6; 525/329.7; 525/330.3; 525/366; 525/370; 525/383
[58] Field of Search ........................... 525/329.6, 329.5

[56] References Cited

U.S. PATENT DOCUMENTS 4,465,813 8/1984 Sattelmeyer et al. .

FOREIGN PATENT DOCUMENTS 0046941 12/1984 European Pat. Off. .

Primary Examiner—Joseph L. Schofer
Assistant Examiner—Wu C. Cheng
Attorney, Agent, or Firm—Bierman and Muserlian

[57] ABSTRACT

Hot melt adhesive compositions having longer pot lives and comprising adhesive thermoplastic compositions having high cohesion and low flowability based on copolymers A) composed of ethylenically unsaturated monomers containing chelating metal compounds B) and, if desired, other conventional additives C), these hot melt adhesive compositions additionally containing an alkylphenolic resin or an arylphenolic resin in amounts of up to 20% by weight, relative to copolymer A), as crosslinking regulator in order to extend the pot life and to improve their processability like a thermoplastic, and processes for preparing hot melt adhesive compositions by mixing the starting components.

13 Claims, No Drawings

HOT MELT ADHESIVES HAVING IMPROVED POT LIVES AND PROCESSES FOR THEIR PREPARATION

The invention relates to hot melt adhesive compositions having a longer pot life and comprising adhesive thermoplastic compositions having high cohesion and low flowability based on copolymers of ethylenically unsaturated monomers containing chelating metal compounds and, if desired, extenders and other conventional additives, these hot melt adhesive compositions additionally containing a crosslinking regulator, preferably an alkylphenolic resin or an arylphenolic resin, to extend the pot life, to increase the heat resistance and the crosslinking temperature and thus to improve the thermoplastic processibility, and furthermore to processes for preparing adhesive thermoplastic compositions according to the invention by mixing the starting components.

In European Patent No. 46,941, thermoplastic compositions having increased cohesion and low flowability and their use, inter alia, as hot melt adhesives and hot melt contact adhesives are disclosed. They essentially comprise (A) at least one copolymer composed of at least one alkyl ester of $\alpha,\beta$-ethylenically unsaturated mono- and/or dicarboxylic acids, at least one amide unsubstituted on the nitrogen of $\alpha,\beta$-ethylenically unsaturated mono- and/or dicarboxylic acids and at least one $\alpha,\beta$-ethylenically unsaturated mono- and/or dicarboxylic acid and, if desired, at least one other $\alpha,\beta$-ethylenically unsaturated copolymerizable monomeric compound, and contain (B) at least one substance acting as a crosslinking agent which is a metal compound of an alkyl acetoacetate having 1 to 6 carbon atoms in the alkyl group or of a dihydric alcohol having 2 to 6 carbon atoms, in which the metal atom is an element from group 2, 3 or 4 of the periodic table of the elements, and they contain, if desired, (C) further additives acting as extenders and other customary additives.

Since the crosslinking can lead to inhomogeneities and anisotropies in the properties when the pure metal compound is added, the crosslinking agent (B) is preferably added in a homogeneous mixture with a synthetic resin composed of component (C), preferably a terpene-phenolic resin, which has good compatibility with the copolymer (A). The preparation of the thermoplastic compositions, which, inter alia, are suitable as hot melt adhesives, is carried out in such a manner that copolymer (A) is treated with the crosslinking component (B) and, if desired, further additives (C) in a heatable mixer, such as a kneader or extruder, at 100° to 150° C., in the course of which crosslinking of copolymer (A) takes place. The mixing process must be discontinued as soon as a noticeable increase in the cohesion of the mixture has taken place and no more substantial increase can be observed, which, depending on the temperature used, is said to be the case in general after 1 to 15 minutes.

However, as has been shown in the meantime, the mixing process described does in general not lead to these average degrees of crosslinking, such as are initially required and desired for the necessary increase in cohesion, but very rapidly and in most cases spontaneously an overcrosslinking with gelling takes place, which no longer allows further processing of the composition. Accordingly, for the practical use of the compositions, this process has the crucial disadvantage that the pot life, calculated from the beginning of the mixing process of the starting components, is only about 5 to 15 minutes. After that, the crosslinked compositions cannot be melted and are rubberlike without, however, losing their contact adhesive properties and their surface tackiness. However, they are no longer processible like a thermoplastic, which can lead to substantial losses and to damage to the melting and application apparatuses.

The object of the present invention was therefore to provide adhesive thermoplastic compositions having high cohesion and low flowability which have a longer residence time in the melting unit and a longer pot life without showing troublesome overcrosslinking or gelling during the processing and the crosslinking of which can then be completed without disadvantages in a suitable manner, for example by a heat treatment at temperatures above the application temperature, to the extent required.

Surprisingly, it has now been found that the object can be achieved by adding a crosslinking regulator having specific activity to the adhesive thermoplastic compositions mentioned which have increased cohesion and low flowability. The preferred crosslinking regulators found were alkylphenolic resins or arylphenolic resins, in particular alkylphenolic resins. Alkylphenolic resins based on trifunctional and/or preferably bifunctional ($C_1$-$C_{12}$)-alkylphenols, in particular ($C_3$-$C_8$)-alkylphenols are particularly preferred. Preferred arylphenolic resins are those based on polyfunctional p-phenylphenols.

The alkylphenolic resins or arylphenolic resins used according to the invention are in particular conventional reaction products of alkylphenols or arylphenols with aldehydes, preferably with formaldehyde. They are added to the thermoplastic compositions preferably in their resol form, in which they are mixed in with the thermoplastic composition either separately or in a mixture with the crosslinking component (B). Surprisingly, it has been found that in particular alkylphenolic resins can inhibit the crosslinking reaction at processing temperatures of up to 120° C. in a particularly efficient manner whereas at temperatures above 130° C. they surprisingly lose their inhibitory effect, so that at temperatures above 130° C. the required final crosslinking state of the adhesive thermoplastic compositions and their conversion into unmeltable materials, after previous application, can be achieved without disadvantages and without loss in adhesive activity. Below 130° C., the hot melt adhesive compositions according to the invention can, however, be kept available in a form in which they are processible like a thermoplastic as a molten composition without troublesome overcrosslinking or gelling for at least 4 hours. By virtue of the higher proportions of crosslinking regulator, longer pot lives can be achieved. However, it is also possible and can be advantageous in some cases to incorporate effective proportions of the crosslinking regulator in the thermoplastic melt at intervals and thus to extend the pot life as desired, for example to more than one day. If desired, the adhesive thermoplastic melt can also be cooled to room temperature and be melted again later with repeated addition of an effective amount of crosslinking regulator and be converted into an applicable thermoplastic state. In contrast to the crosslinking-regulating activity specific for a certain temperature range of the crosslinking regulators according to the invention, the additives described, for example, in European Patent 46,941 as additional components (C), in particular the terpenephenolic resins described there, show no crosslinking-regulating activity, so that the effect of the crosslinking regulators according to the invention seems even more surprising.

Accordingly, the invention relates to adhesive thermoplastic compositions having high cohesion, low flowability and a longer pot life and based on copolymers of ethylenically unsaturated monomers and chelating agents, comprising A) 90 to 99.99% by weight, preferably 95 to 99.9% by weight, of at least one copolymer composed of
  a) 20 to 95% by weight, preferably 40 to 80% by weight, of at least one ($C_1$–$C_{12}$)-alkyl ester of $\alpha,\beta$-ethylenically unsaturated mono- and/or dicarboxylic acids,
  b) 0.1 to 20% by weight, preferably 0.5 to 15% by weight, of at least one amide unsubstituted on the nitrogen of $\alpha,\beta$-ethylenically unsaturated mono- and/or dicarboxylic acids,
  c) 0.1 to 15% by weight, preferably 0.2 to 10% by weight, of at least one $\alpha,\beta$-ethylenically unsaturated mono- and/or dicarboxylic acid, and
  d) 0 to 50% by weight, preferably 0 to 40, in particular 0.1 to 30, % by weight, of at least one other $\alpha,\beta$-ethylenically unsaturated copolymerizable compound which is different from the monomers mentioned under a) to c), and B) 0.01 to 10% by weight, preferably 0.1 to 5% by weight, of at least one substance having a crosslinking action and being a metal compound of an alkyl acetoacetate having 1 to 6 carbon atoms in the alkyl group or of a dihydric alcohol having 2 to 6 carbon atoms in which the metal atom is an element from group 2, 3 or 4 of the periodic table of the elements, the amounts of A) +B) and a) to d) each having to add up to 100% by weight, and if desired C) further additives acting as extenders and other conventional additives, which adhesive thermoplastic compositions additionally contain D) an effective amount of a crosslinking regulator.

Alkylphenolic resins or arylphenolic resins, in particular alkylphenolic resins, are preferably used as crosslinking regulators. Alkylphenolic resins composed of trifunctional and/or preferably bifunctional ($C_1$–$C_{12}$)-alkylphenols, in particular ($C_3$–$C_8$)-alkylphenols, and aldehydes are particularly preferred. Preferred arylphenolic resins are those from polyfunctional p-phenylphenols and aldehydes. Resins from the alkyl- and arylphenols mentioned and formaldehyde, in particular resins of the resol type, are particularly preferred.

For example, alkylphenol/formaldehyde resins of the resol type, such as, for example, the commercial product ®Alresen PA 103 (manufacturer: Hoechst AG), are particularly preferred.

The amount of crosslinking regulator D) used is, according to the invention, preferably 2 to 20% by weight, in particular 5 to 15, particularly preferably 8 to 12, % by weight, relative to the amount of copolymer A), the upper limits of the abovementioned amounts used not being critical.

Crosslinking regulator D) can be incorporated in the thermoplastic compositions by conventional methods. The preferred procedure consists in first melting copolymer A) in a heatable mixer, for example a kneader, preferably at a temperature of 90° to 130° C., in particular 110° to 120° C., as a result of which it generally adopts a viscous, honey-like consistency. Crosslinking regulator D), which is preferably present in solid form, is then admixed to the melted copolymer A), in the course of which it dissolves in the melt of copolymer A). Components B) and if desired, C) are then admixed to the melt in the heated mixer, in the course of which these components at the melting temperature mentioned, which has to be maintained, preferably at 110° to 120° C., and with thorough mixing are either dissolved or homogeneously dispersed, resulting in the desired adhesive thermoplastic and further heat-curable crosslinkable composition having high cohesion and low flowability in an applicable form which can be maintained in an applicable state at temperatures of up to 120° C., preferably between 110° and 120° C., for at least 4 hours or up to one day or longer without substantial increase in viscosity or overcrosslinking. After the thermoplastic has been applied, for example by drawing out to a film with a knife or other applicators, the thermoplastic composition can be converted to the required unmeltable final crosslinking state by increasing the temperature to more than 130° C., preferably to 130° to 200° C., in particular to 150° to 180° C.

A further preferred variation of the invention is to incorporate components B) and D) as a mixture in the thermoplastic hot melt adhesive composition, if desired in admixture with further constituents of component C), it being possible for these mixtures to constitute solutions or disperse systems. Furthermore, in some cases, it can be particularly advantageous to admix crosslinking regulator D) in portions at intervals to the thermoplastic composition.

The melting and mixing of components A) to D) can be carried out batchwise, for example in a kneader, or continuously, preferably in a heatable single-screw or twin-screw extruder equipped with suitable feed and mixing zones arranged in the desired order. It is preferred to use heatable twin-screw extruders. In some cases, it can be advantageous to prepare the applicable thermoplastic hot melt adhesive composition under an inert gas atmosphere, for example nitrogen, and keep it under the inert gas until it is applied, for example in order to prevent discoloration.

Since component C) frequently constitutes or contains an extender for component B), it may be advantageous in some cases first to mix components B) and C) separately with one another and use the resulting mixture for preparing the thermoplastic hot melt adhesive composition.

Accordingly, the invention further relates to processes for the preparation of adhesive thermoplastic compositions according to the invention having high cohesion, low flowability and extended pot life by mixing components A)+D) and B) and, if desired, C) in heatable mixers, such as, for example, kneaders, single-screw extruders or twin-screw extruders, preferably at temperatures between 90° and 130° C., in particular 110° to 120° C., either batchwise or continuously.

The invention furthermore relates to the application of thermoplastic hot melt adhesive compositions according to the invention in not overcrosslinked and ungelled form at temperatures of 90° to 130° C., preferably at 110° to 120° C., and subsequent conversion of the adhesive thermoplastic compositions into the required unmeltable final crosslinking state by heat treatment at temperatures above 130° C., preferably 130° to 200° C., in particular at 150° to 180° C.

Components D) which are used preferably are alkylphenol/formaldehyde resins having alkylphenol groups comprising p-isobutylphenol, p-tert.-butylphenol, p- tert.-amylphenol, p-isooctylphenol and o- or p-cyclohexylphenol and p-phenylphenol/formaldehyde resins, all of them preferably of the resol type. Butylphenol/formaldehyde resins in the resol form are particularly preferred.

Examples of suitable carboxylic acids for components a) to c) of copolymer A) are crotonic acid, itaconic acid, maleic acid and/or fumaric acid and carboxyl-containing monomers derived from styrene, but preferably acrylic and/or methacrylic acid.

Examples of alkyl radicals in the ester component a) are preferably methyl, ethyl, propyl, butyl, hexyl, 2-ethylhexyl, decyl and dodecyl and isomers thereof.

Mono- and/or diamides of the acids mentioned and monoamides of the monoesters of the abovementioned unsaturated dicarboxylic acids having 1 to 12 carbon atoms in the alkyl group, for example the abovementioned alkyl radicals, are used as amides b). It is particularly advantageous to use as component a) 2-ethylhexyl acrylate by itself or in a mixture with butyl acrylate or a predominant proportion of more than 50% by weight of 2-ethylhexyl acrylate or its mixture with butyl acrylate in a mixture with other esters. In the mixture of the two esters mentioned, the butyl acrylate content can be up to 70, preferably 10 to 50% by weight, relative to 100% by weight of the ester mixture. Butyl acrylate is understood to mean the n-, sec.-, tert.- or iso-butyl acrylate, n-butyl acrylate being preferred.

Examples of suitable compounds d) are preferably styrene, α-methylstyrene, the various vinyltoluenes, ethylene, vinyl acetate and/or vinyl chloride.

In a preferred embodiment of the adhesive thermoplastic compositions according to the invention, copolymer A) used is a product synthesized from a) 55 to 65% by weight of 2-ethylhexyl acrylate, 15 to 30% by weight of butyl acrylate and 3 to 15% by weight of methyl methacrylate, b) 2 to 10% by weight of acrylamide and c) 0.3 to 5% by weight of acrylic acid, each relative to copolymer A).

Copolymers A) can be obtained by conventional preparation methods, such as solution or bulk polymerization, block or graft polymerization, with the use of polymerization initiators, if appropriate with the additional use of molecular weight regulators. The most favorable results can be obtained by carrying out the copolymerization in the presence of solvents and then separating off the solvents by distillation at elevated temperature, i.e. up to about 200° C., if appropriate under reduced pressure. Suitable polymerization initiators are preferably peroxides, such as di-tert.-butyl peroxide, dicumyl peroxide, cumene hydroperoxide, tert.-butyl hydroperoxide, tert.-butyl perbenzoate, tert.-butyl peroctoate, dibenzoyl peroxide, methyl ethyl ketone peroxide, each individually or in a mixture, or azoisobutyrodinitrile, in amounts of 0.1 to 3, preferably 0.3 to 1% by weight, relative to the sum of components a) to d). Examples of suitable solvents are aromatic hydrocarbons, such as toluene and xylene, and mixtures thereof with saturated hydrocarbons, such as cyclohexane or benzine fractions, and/or alcohols, for example the various butanols. Since some solvents, for example aromatic hydrocarbons or alcohols, can have a chain-terminating effect, it is possible to effect the molecular weight and the viscosity of the copolymer and thus of the hot melt contact adhesives by selecting the solvent mixture used.

In most cases, copolymers A) have a melt viscosity, measured at 180° C., of 5000 to 100,000, preferably 10,000 to 50,000 mPa.s. They have high thermal stability and can therefore be kept in a melt at temperatures of up to 200° C. and for a period of up to 72 hours without substantial changes in viscosity, color or other properties.

The metal atom in the substances B) having a cross-linking effect is preferably, for example, zinc, magnesium, boron or titanium, but in particular aluminum. The amounts given of the metal compounds of 0.01 to 10% by weight (calculated as a 100% pure substance) relate to the sum of components A)+B) (=100% by weight).

If appropriate, component C) is used in amounts of 1 to 500, preferably 50 to 250 parts by weight, relative to 100 parts by weight of the sum of components A)+B), but smaller amounts can also be used.

Additives C) which can be used are, for example, natural resins, such as balsam, root, tall, rosin and copal resins and modified resins derived therefrom. The modification can be carried out with polyhydric alcohols, for example glycerol, pentaerythritol and glycols by esterification or by reaction with ethylenically unsaturated mono- and/or dicarboxylic acids, for example the ones mentioned above. It is also possible to use copolymers of esterified natural resins with styrene, the various vinyltoluenes or acrylic or methacrylic acid. Terpene-phenolic resins and rosin resins modified with phenolic resins are particularly advantageous.

Resins if used as component C) are in general preferably present in an amount of from 1 to 100, in particular 2 to 50 parts by weight, relative to 100 parts by weight of the sum of components A)+B).

Furthermore, synthetic resins, such as hydrocarbon resins, for example based on dicyclopentadiene, coumarone, indene or $C_4$- to $C_5$- or $C_9$-distillation fractions obtained during the petrochemical processing of crude oil may be suitable as component C). Resins based on ketones, such as acetone, methyl ethyl ketone and cyclohexanone obtained by reaction of these compounds with formaldehyde are also suitable.

Plasticizers, for example those based on phthalic, adipic, sebacic, acelaic and phosphoric esters in which the alcohol moiety contains 1 to 13 carbon atoms may be suitable as further additives C). Moreover, the phosphoric esters can be esterified with phenol or cresol. It is also possible to use plasticizers which react with copolymer A) via a monofunctional reactive group, such as glycidyl ethers or long-chain monoisocyanates, and extender oils, such as, for example, mineral oil.

Furthermore, waxes may be suitable as further additives C), such as montan waxes or synthetic products based on olefins, for example polyethylene or polypropylene waxes, and lower-molecular-weight polymerization products of isobutylene, butadiene, isoprene, styrene, vinyl alkyl ethers whose alkyl radical contains 1 to 8 carbon atoms, vinylcarboxylic esters in which the carboxylic acid radical contains 1 to 12 carbon atoms, vinylcyclohexane or α-methylstyrene. If they are compatible, thermoplastic rubbers, such as can be obtained, for example, by block copolymerization of styrene with butadiene or styrene with isoprene, are also suitable as mixing components.

Of the class of bituminous products, unprocessed, blown, oxidized or otherwise modified bitumina, such as can be obtained in crude oil or coal recovery, may be suitable.

Fillers, for example inorganic products, such as barium sulfate, calcium carbonate, calcium sulfate, magnesium silicate, calcium/magnesium carbonate, alumina, quartz powder, colloidal or highly disperse silicas, which can all be used by themselves or in mixtures, may also be suitable as additive C). Pigments can also be used, although they must have high temperature resistance and should advantageously belong to the class of inorganic products or highly stable organic compounds, such as, for example, phthalocyanine dyes. Fiber materials having a reinforcing effect can also be used as extenders, for example asbestos or glass fibers and also synthetic products, such as polyester or polyamide fibers.

The adhesive thermoplastic compositions according to the invention can, in particular due to their extended pot life and the resulting good and easy handling, particularly advantageously be used, for example, as hot melt adhesives and hot melt contact adhesives, coating adhesives, sealable coatings, other adhesive or barrier, films and webs, furthermore as protective layer on metals by direct application or by application in the form of films.

The invention is illustrated in more detail by the examples which follow. pbw denotes parts by weight and % denotes % by weight, unless stated otherwise.

EXAMPLE 1

The starting components described below which have the compositions given are used for preparing adhesive thermoplastic compositions having high cohesion and low flowability which can be converted into unmeltable, rubber-like and surface-active contact adhesive compositions by a heat aftertreatment, with which pot life tests are then carried out.

Component A

Solid copolymer powder prepared by solution copolymerization and comprising the following comonomer units:
61% by weight of 2-ethylhexyl acrylate
23% by weight of butyl acrylate
9% by weight of methyl methacrylate
6% by weight of acrylamide
1% by weight of acrylic acid The copolymer has a melt viscosity of 45,000 mPa.s at 180° C. and a glass-transition temperature ($T_G$) of −45° C.

Component B

Commercially available aluminum alcoholate, solid, coarse-grained ((R)Additol VXL 12, manufacturer: Hoechst AG).

Component C

Commercially available terpenephenolic resin, solid, scale-like ((R)Alresen PT 214, manufacturer: Hoechst AG).

Component D

Commercially available alkylphenol/formaldehyde resin of the resol type, solid, scale-like ((R)Alresen PA 103, manufacturer: Hoechst AG).

COMPARATIVE EXAMPLE 1

The components from Example 1 mentioned below are placed in the order and amount given at 120° C. in a heatable kneader, and converted into a melt at 120° C. with vigorous mixing in the following manner:

100 pbw of component A are first introduced and melted.

A mixture of 9 pbw of component C and 2 pbw of component B which was melted beforehand and then powdered is then added to this melt and mixed homogeneously, in the course of which an adhesive thermoplastic composition having high cohesion and low flowability is obtained at 110° to 120° C. in an applicable form, which is kept at a temperature of about 120° C. with constant gentle mixing. Soon after the mixture of components C and B has been admixed, the viscosity of the mixture increases and it is already clearly higher 5 minutes later. About 15 minutes later, the composition undergoes extensive gelling, obviously as a result of overcrosslinking, and becomes unmeltable and rubber-like without, however, losing the contact adhesive properties and the surface tackiness, and it is no longer processible like a thermoplastic. The overcrosslinking can be reinforced further by a subsequent heat aftertreatment at 180° C. Due to its short pot life of at most 15 minutes at 120° C., the thermoplastic composition can only be processed during this very short period and becomes unusable after this time.

EXAMPLES 2 TO 4

Comparative Example 1 is repeated, using in each case the following modifications according to the invention:

After the melting process, 2 pbw (=Example 2) or 8 pbw (=Example 3) or 15 pbw (=Example 4) of component D from Example 1 (=alkylphenolic resin) are first added and incorporated in starting component A at the melting temperature of A, component D being dissolved in component A. Components B and C, respectively, are then incorporated as described in Comparative Example 1, and the resulting adhesive thermoplastic compositions having high cohesion and low flowability in an applicable form are kept at a temperature of about 120° C. with constant gentle mixing. The times (hours) after which at about 120° C. the compositions are in each case still theremoplastic and applicable (pot life *) are summarized in Table 1. After the times corresponding to the pot lives given, each of the compositions is applied to a stainless steel sheet in the form of a 2 mm thick film by means of a knife and then heated at 170° C. for 30 minutes. Table 1 indicates whether the desired or required overcrosslinking has been achieved after this 30-minute heating at 170° C. and the composition has in each case become unmeltable and rubber-like, while maintaining its contact adhesive properties and its surface tackiness.

*) The times given are not the maximum achievable pot lives, the latter are higher in each case and were not determined.

EXAMPLE 5

Example 4 is repeated, except that the 15 pbw of component D are not added and incorporated all at once but in 3 portions at various intervals, namely
a) 4 pbw of component D during the melting of component A,
b) 5 pbw of component D 5 hours after incorporating components B and C, and
c) 6 pbw of component D 10 hours after incorporating the 5 pbw of component D mentioned above under b).

Table 1 lists the time after which the adhesive hot melt composition constantly maintained at about 120° C. is still thermoplastic and applicable (pot life*) and is applied, and whether after application as a film the subsequent heating of the film at 170° C. for 30 minutes achieves the desired overcrosslinking in each case.

*) The times given are not the maximum achievable pot lives, the latter are higher in each case and were not determined.

EXAMPLE 6

Example 5 is repeated, except that in each case before the addition of portions b) (5 pbw of component D) and c) (6 pbw of component D) the melt is cooled to room temperature and after 5 hours each time in a kneader it is first melted again and brought to about 120° C. before portions b) and c) of component D, respectively, are added and admixed. The applicability of the melt resulting after addition of the respective portions a) to c) of component D and maintained at about 120° C. (pot life*) and its overcrosslinking state, after application and subsequent heating at 170° C. for 30 minutes have been completed, are also shown in Table 1.

*) The times given are not the maximum achievable pot lives, the latter are higher in each case and were not determined.

TABLE 1

| Thermoplastic contact adhesive hot melt from Example | Processible like a thermoplastic after pot life at 120° C. of | Melt behavior of the applied thermoplastic contact adhesive melt after 30 minutes of heat aftertreatment at 170° C. | Surface tack and contact adhesive property of contact adhesive having become unmeltable |
|---|---|---|---|
| 2 | 4 hours: yes | unmeltable | on-specification |
| 3 | 9 hours: yes | unmeltable | on-specification |
| 4 | 17 hours: yes | unmeltable | on-specification |
| 5 | 17 hours: yes | unmeltable | on-specification |
| 6 | 17 hours: yes | unmeltable | on-specification |
| Comparative Example 1 | 15 min.: yes | unmeltable | on-specification |
| Comparative Example 1 | 20 min.: no (product is unmeltable) | | |

What we claim is:

1. An adhesive thermoplastic composition having high cohesion, low flowability and a longer pot life and based on copolymers of ethylenically unsaturated monomers and chelating agents comprising
   A) 90 to 99.99% by weight of at least one copolymer comprising
      a) 20 to 95% by weight of at least one alkyl of 1 to 12 carbon atoms ester of α,β-ethylenically unsaturated mono- and/or dicarboxylic acids,
      b) 0.1 to 20% by weight of at least one amide unsubstituted on the nitrogen of α,β-ethylenically unsaturated mono- and/or dicarboxylic acids,
      c) 0.1 to 15% by weight of at least one α,β-ethylenically unsaturated mono- and/or dicarboxylic acid, and
      d) 0 to 50% by weight of at least one other α,β-ethylenically unsaturated copolymerizable compound which is different from the monomers of a) to c), and
   B) 0.01 to 10% by weight of at least one substance having a crosslinking action and being a metal compound of an alkyl acetoacetate of 1 to 6 carbon atoms in the alkyl or of a dihydric alcohol of 2 to 6 carbon atoms in which the metal atom is an element from group 2, 3 or 4 of the periodic table of the elements, the amounts of A)+B) and a) to d) each adding up to 100% by weight and optionally
   C) further additives acting as extenders and other conventional additives which adhesive thermoplastic compositions additionally contain
   D) an effective amount of an alkylphenolic resin or an arylphenolic resin as a crosslinking regulator.

2. An adhesive thermoplastic composition of claim 1 containing an alkylphenolic resin of the resol type of trifunctional and/or bifunctional ($C_1$-$C_{12}$)-alkylphenols or polyfunctional p-phenylphenols and aldehydes as the crosslinking regulator.

3. An adhesive thermoplastic composition of claim 1 containing 2 to 20% by weight of crosslinking regulator relative to the amount of copolymer A).

4. An adhesive thermoplastic composition of claim 1 containing aluminum alcoholates of dihydric alcohols of 2 to 6 carbon atoms as metal compounds B) acting as a crosslinking agent.

5. An adhesive thermoplastic composition of claim 1 wherein copolymer A) contains as monomer units
   a) 55 to 65% by weight of 2-ethylhexyl acrylate, 15 to 30% by weight of butyl acrylate and 3 to 15% by weight of methyl methacrylate,
   b) 2 to 10% by weight of acrylamide and
   c) 0.3 to 5% by weight of acrylic acid, each relative to copolymer A).

6. An adhesive thermoplastic composition of claim 1 containing 95 to 99.9% by weight of copolymer A).

7. An adhesive thermoplastic composition of claim 1 containing 0.1 to 5% by weight of component B).

8. An adhesive thermoplastic composition of claim 1 containing 40 to 80% by weight of component a).

9. An adhesive thermoplastic composition of claim 1 containing 0.5 to 15% by weight of component b).

10. An adhesive thermoplastic composition of claim 1 containing 0.2 to 10% by weight of component c).

11. An adhesive thermoplastic composition of claim 1 containing 0 to 40% by weight of component d).

12. An adhesive thermoplastic composition of claim 1 containing 0.1 to 30% by weight of component d).

13. An adhesive thermoplastic composition of claim 2 wherein the resol type of resin is a bifunctional alkyl phenol of 3 to 8 alkyl carbon atoms or polyfunctional p-phenylphenols and formaldehyde.

* * * * *